(12) United States Patent
Yamaguchi

(10) Patent No.: US 10,730,480 B2
(45) Date of Patent: Aug. 4, 2020

(54) MOBILE DEVICE DETECTION APPARATUS AND MOBILE DEVICE DETECTION METHOD

(71) Applicant: DENSO CORPORATION, Kariya, Aichi-pref. (JP)

(72) Inventor: Taichi Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/427,727

(22) Filed: May 31, 2019

(65) Prior Publication Data

US 2019/0283710 A1    Sep. 19, 2019

Related U.S. Application Data

(63) Continuation of application No. PCT/JP2017/038660, filed on Oct. 26, 2017.

(30) Foreign Application Priority Data

Dec. 20, 2016    (JP) .................................. 2016-246127

(51) Int. Cl.
*H04W 4/40* (2018.01)
*B60R 25/24* (2013.01)
*H04W 4/02* (2018.01)
*H04W 8/00* (2009.01)
*H04W 84/10* (2009.01)
*H04B 1/59* (2006.01)
(Continued)

(52) U.S. Cl.
CPC .............. *B60R 25/24* (2013.01); *E05B 49/00* (2013.01); *H04B 1/59* (2013.01); *H04W 4/023* (2013.01); *H04W 4/40* (2018.02); *H04W 8/005* (2013.01); *H04W 84/10* (2013.01); *E05B 81/64* (2013.01)

(58) Field of Classification Search
CPC ...... B60R 25/24; H04W 8/005; H04W 4/023; H04W 4/40; E05B 81/64
See application file for complete search history.

(56) References Cited

U.S. PATENT DOCUMENTS 6,552,649 B1 *  4/2003  Okada ................. B60R 25/2036
                                                          307/10.1
2004/0205189 A1   10/2004  Sata et al.
(Continued)

FOREIGN PATENT DOCUMENTS

EP          1443471 A2    8/2004
JP       2000073635 A    3/2000
(Continued)

*Primary Examiner* — Chuong A Ngo
(74) *Attorney, Agent, or Firm* — Harness, Dickey & Pierce, P.L.C.

(57) ABSTRACT

A mobile device detection apparatus is mounted on a vehicle equipped with a plurality of antennas, transmits a request signal for requesting a response to a mobile device that exists within a range communicable with the vehicle from a predetermined antenna among the plurality of antennas, receives a response signal returned from the mobile device to detect an existence of the mobile device, transmits a reply request signal for requesting a reply signal to the mobile device when the existence of the mobile device is detected, and receives the reply request signal from the mobile device using the plurality of antennas to detect an existence position of the mobile device.

15 Claims, 10 Drawing Sheets

(51) Int. Cl.
  *E05B 49/00* (2006.01)
  *E05B 81/64* (2014.01)

(56) References Cited

U.S. PATENT DOCUMENTS

| | | |
|---|---|---|
| 2007/0200669 A1 | 8/2007 | McBride et al. |
| 2007/0200672 A1 | 8/2007 | McBride et al. |
| 2013/0237189 A1 | 9/2013 | Nishidai |
| 2016/0125722 A1 | 5/2016 | Ueki et al. |
| 2016/0251890 A1 | 9/2016 | Sakai |
| 2017/0120868 A1 | 5/2017 | Watanabe et al. |
| 2017/0190318 A1 | 7/2017 | Imamura |
| 2019/0156593 A1* | 5/2019 | Sasaki .................... G07C 5/085 |

FOREIGN PATENT DOCUMENTS

| | | |
|---|---|---|
| JP | 2008190457 A | 8/2008 |
| JP | 2013185376 A | 9/2013 |
| JP | 2015116975 A | 6/2015 |
| JP | 2016030919 A | 3/2016 |
| JP | 2016160589 A | 9/2016 |

* cited by examiner

MOBILE DEVICE DETECTION APPARATUS AND MOBILE DEVICE DETECTION METHOD

CROSS REFERENCE TO RELATED APPLICATIONS

The present application is a continuation application of International Patent Application No. PCT/JP2017/038660 filed on Oct. 26, 2017, which designated the United States and claims the benefit of priority from Japanese Patent Application No. 2016-246127 filed on Dec. 20, 2016. The entire disclosures of all of the above applications are incorporated herein by reference.

TECHNICAL FIELD

The present disclosure relates to a mobile device detection apparatus and a mobile device detection method.

BACKGROUND

In vehicles, a technique called a passive entry system has been widely used. In the passive entry system, a door of a vehicle is automatically unlocked to enter the vehicle when a user of the vehicle approaches the vehicle with carrying a key.

SUMMARY

The present disclosure provides a mobile device detection apparatus or a mobile device detection method applied to a vehicle equipped with a plurality of antennas. In the mobile device detection apparatus or the mobile device detection method, a request signal for requesting a response is transmitted to a mobile device that exists within a range communicable with the vehicle from a predetermined antenna among the plurality of antennas, a response signal returned from the mobile device is received to detect an existence of the mobile device, a reply request signal is for requesting a reply signal is transmitted to the mobile device when the existence of the mobile device is detected, and the reply request signal from the mobile device is received using the plurality of antennas to detect an existence position of the mobile device.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
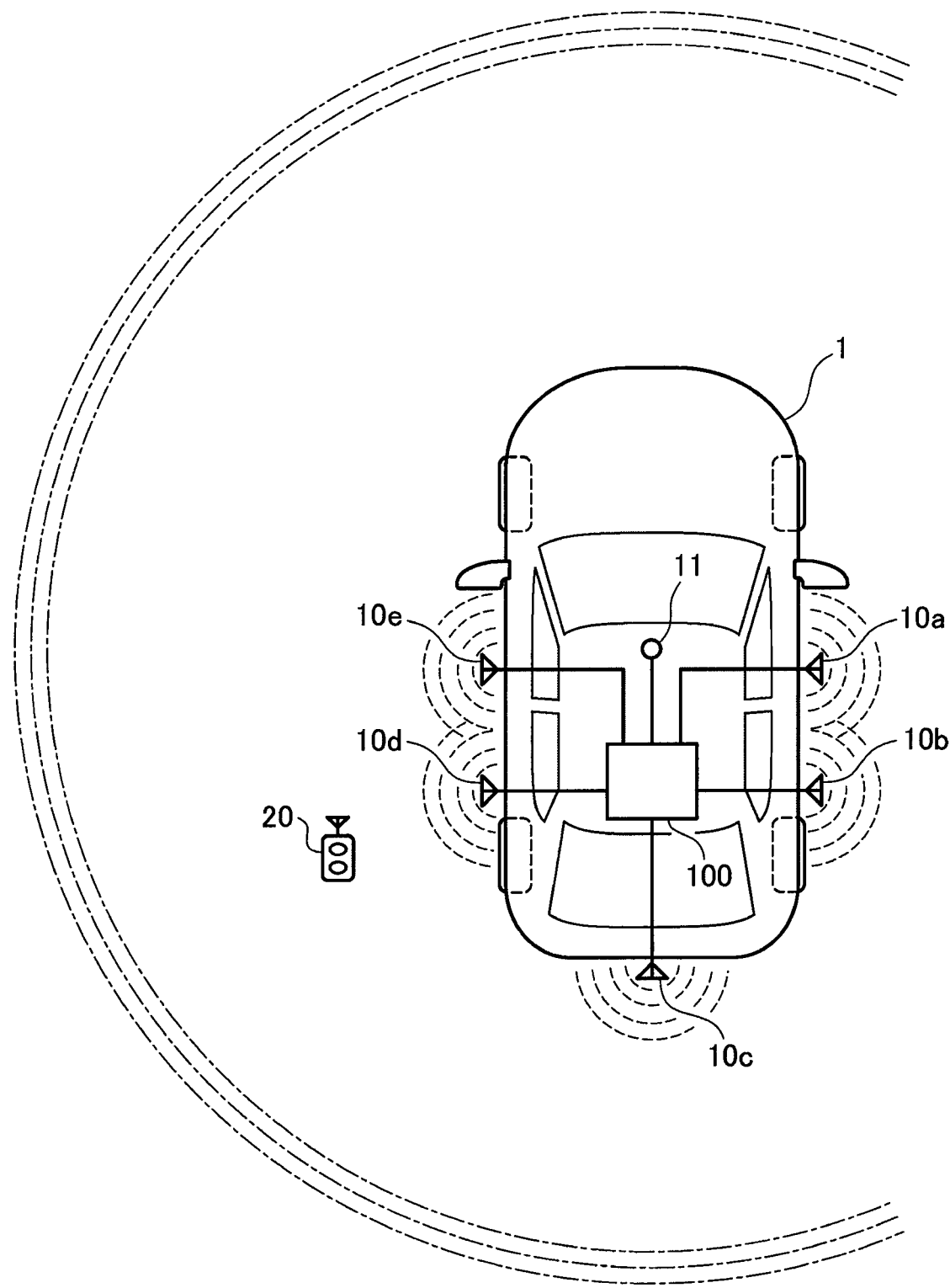
FIG. 1 is an illustrative diagram showing a rough structure of a vehicle equipped with a mobile device authentication device according to the present embodiment.

Some passive entry systems are realized as follows. First, an antenna is mounted on a plurality of doors of the vehicle (including a rear door in the case of a vehicle having the rear door), and radio waves are transmitted from the respective antennas toward a periphery of the vehicle. In addition, a function of transmitting and receiving a radio wave is also installed in the key carried by the user, and a response signal is returned when the radio wave from the vehicle is received. In this way, on the vehicle side, it can be recognized from which direction the user approaches based on which antenna receives the response signal. Thereafter, whether or not the key is a regular key is authenticated by a communication with the key of the user using the antenna that has received the response signal, and when it is determined through the authentication that the key carried by the user is the regular key, the door of the vehicle is unlocked. As a result, the user carrying the regular key can open the door and enter the vehicle without performing an unlocking operation by using the key. As described above, since the function of transmitting and receiving the radio wave is installed in the key used in the passive entry system, the key used in the passive entry system is usually referred to as a "mobile device".

In such passive entry systems, an intensity of the radio wave transmitted from the vehicle is set so that a range in which the radio wave reaches is limited to a periphery of the vehicle, for example, in a range of about 1.5 meters from the vehicle. This is because, for example, if the radio wave reaches a distance of 30 meters from the vehicle, the door of the vehicle is unlocked by the user who carries the mobile device when the user passes within a range of 30 meters from the vehicle while not knowing, which is undesirable from the viewpoint of security.

In addition, because the intensity of the radio wave from the vehicle is set to such intensity, a frequency at which the vehicle transmits the radio wave to the surroundings is set to a relatively high frequency. The reason will be described below. For example, if it is assumed that the user carrying the mobile device approaches the vehicle to intend to get into the vehicle, the vehicle side cannot recognize the mobile device unless the user approaches the periphery of the vehicle (for example, 1.5 meters from the vehicle). Therefore, in consideration of a time required to unlock the door after checking whether or not the mobile device is a regular mobile device, if the vehicle side does not recognize a fact that the user approaches the periphery of the vehicle as soon as possible, the unlocking of the door will not occur in time to cause the user to wait for unlocking. Therefore, the vehicle side transmits the radio wave at a relatively high frequency (for example, about once per second. When multiple antennas are mounted, the radio wave is transmitted once per second for each antenna) so that the vehicle side can immediately recognize approaching the periphery of the vehicle.

Naturally, the vehicle side does not know when and from which direction the user carrying the mobile device approaches the vehicle. Therefore, under such a circumstance, in the vehicle equipped with the passive entry system, the radio waves are continuously transmitted from the multiple antennas at a relatively high frequency until the user gets into a vehicle interior with carrying the mobile device.

However, in the passive entry systems described above, since there is a need to continuously transmit the radio waves from the plurality of antennas mounted on the vehicle at a relatively high frequency, there is an issue that a power consumption increases.

A mobile device detection apparatus according to an aspect of the present disclosure is to be mounted on a vehicle equipped with a plurality of antennas for detecting an existence position of a mobile device that exists within a range communicable with the vehicle. The mobile device detection apparatus includes an existence detector that transmits a request signal for requesting a response to the mobile device from a predetermined antenna among the plurality of antennas and receives a response signal returned from the mobile device to detect an existence of the mobile device, and a position detector that transmits a reply request signal for requesting a reply signal to the mobile device when the existence of the mobile device is detected, and receives the reply signal from the mobile device using the plurality of antennas to detect the existence position of the mobile device.

A mobile device detection method according to another aspect of the present disclosure is applied to a vehicle equipped with a plurality of antennas for detecting an existence position of a mobile device that exists within a range communicable with the vehicle, and includes transmitting a request signal for requesting a response to the mobile device from a predetermined antenna among the plurality of antennas, receiving a response signal returned from the mobile device to detect an existence of the mobile device, transmitting a reply request signal for requesting a reply signal to the mobile device upon detecting the existence of the mobile device, and receiving the reply signal from the mobile device using the plurality of antennas to detect the existence position of the mobile device.

A mobile device detection apparatus according to another aspect of the present disclosure is to be mounted on a vehicle equipped with a plurality of antennas, for detecting an existence position of a mobile device that exists within a range communicable with the vehicle. The plurality of antennas including a detection transmission antenna, a detection reception antenna, a plurality of authentication transmission antennas, and a plurality of authentication reception antennas. The mobile device detection apparatus includes a request signal transmitter, a response signal receiver, an existence detector, a signal transmitter, a signal receiver, and a position detector. The request signal transmitter is configured to be connected to the detection transmission antenna. The response signal receiver is configured to be connected to the detection reception antenna. The existence detector is connected to the request signal transmitter and the response signal receiver, instructs the request signal transmitter to transmit a request signal for requesting a response at a first time interval through the detection transmission antenna, and detects an existence of the mobile device by acquiring information, from the response signal receiver, that the response signal receiver receives a response signal from the mobile device through the detection reception antenna. The signal transmitter is configured to be connected to the plurality of authentication transmission antennas. The signal receiver is configured to be connected to the plurality of authentication reception antennas. The position detector is connected to the existence detector, the signal transmitter, and the signal receiver, instructs the signal transmitter to transmit a reply request signal for requesting a reply signal at a second time interval through each of the plurality of authentication transmission antennas when receiving information, from the existence detector, that the existence detector detects the existence of the mobile device, and detects the existence position of the mobile device based on the reply signal transmitted from the mobile device and received by the signal receiver through at least one of the plurality of authentication reception antennas. The first time interval is set to be longer than the second time interval.

According to the above-described mobile device detection apparatuses and the above-described mobile device detection method, the existence position of the mobile device has only to be detected using the plurality of antennas after the response signal from the mobile device is received. Thus, a power consumption of a passive entry system can be restricted.

Hereinafter, embodiments will be described in order to clarify the contents of the present disclosure described above.

A. Apparatus Configuration:

FIG. 1 shows a rough structure of a vehicle 1 provided with a mobile device authentication device 100 according to the present embodiment. As shown in the figure, the vehicle 1 includes a mobile device authentication device 100 for authenticating a mobile device 20 that exists in a periphery of the vehicle 1, authentication antennas 10a to 10e used for authenticating the mobile device 20, and a detection antenna 11 for detecting an existence of the mobile device 20, and the authentication antennas 10a to 10e and the detection antenna 11 are connected to the mobile device authentication device 100. Since the mobile device authentication device 100 according to the present embodiment detects a position where the mobile device 20 exists before authenticating the mobile device 20 that exists in the periphery of the vehicle, the mobile device authentication device 100 according to the present embodiment corresponds to a "mobile device detection apparatus" in the present disclosure.

Among the five authentication antennas 10a to 10e, the authentication antenna 10a is built in a door on a driver's seat side, and the authentication antenna 10b is built in a door on a rear seat on the driver's seat side. The authentication antenna 10c is built in a trunk lid, the authentication antenna 10d is built in a door on a rear seat on a front passenger seat side, and the authentication antenna 10e is built in the door on the front passenger seat side. Those authentication antennas 10a to 10e transmit radio waves toward a vehicle exterior and receive the radio waves from the vehicle exterior. In this example, a distance over which the authentication antennas 10a to 10e can transmit the radio waves is set to a relatively short distance, typically about 1.5 meters. The reason is because since the authentication antennas 10a to 10e are used for authentication of the mobile device 20, if the mobile device 20 too far from the vehicle 1 is authenticated and the door of the vehicle 1 is unlocked, a security problem occurs. In FIG. 1, concentric circular arcs indicated by broken lines around the authentication antennas 10a to 10e represent radio waves transmitted from the authentication antennas 10a to 10e.

The authentication antennas 10a to 10e according to the present embodiment use radio waves of a relatively long wavelength called an LF wave when transmitting the radio waves, and use radio waves of a relatively short wavelength called an RF wave when receiving the radio waves. Therefore, strictly speaking, the antenna for transmission and the antenna for reception are separate from each other, but in FIG. 1, the antenna for transmission and the antenna for reception are displayed as one antenna for the purpose of avoiding complication of illustration.

The detection antenna 11 is mounted in the vehicle interior of the vehicle 1, and can transmit and receive the radio waves to and from the outside of the vehicle 1 with the use of radio waves having a wavelength shorter than that of the authentication antennas 10a to 10e. A distance over which the detection antenna 11 can transmit the radio waves is set to be sufficiently longer (typically about 30 to 50 meters) than a distance over which the authentication antennas 10a to 10e can transmit the radio waves. In FIG. 1, large concentric circular arcs indicated by a dash-dot line around the vehicle 1 represents the radio waves transmitted from the detection antenna 11.

The mobile device authentication device 100 authenticates the mobile device 20 by transmitting and receiving the radio waves to and from the mobile device 20 with the use of the authentication antennas 10a to 10e. However, as described above, since the distance over which the authentication antennas 10a to 10e can transmit the radio waves is set to a relatively short distance, the mobile device 20 cannot be authenticated by using any of the authentication antennas 10a to 10e. The antenna which can be used for the authentication is limited to the antenna which is located at a distance at which the transmitted radio waves reach the mobile device 20. Therefore, the mobile device authentication device 100 identifies an antenna that can be used for authentication of the mobile device 20 by the following method.

Figure 2:
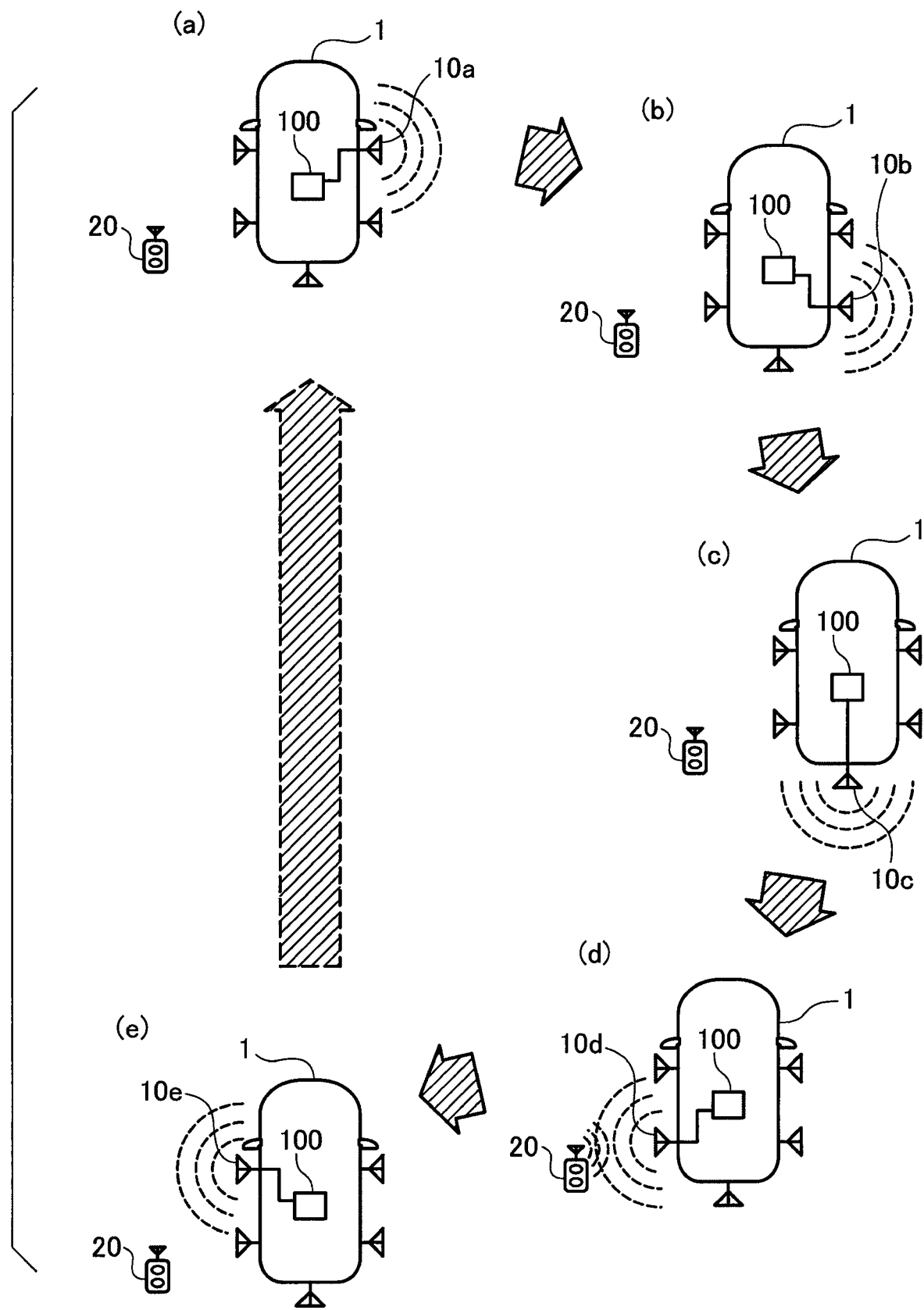
FIG. 2 is an illustrative diagram showing a method of detecting a position of a mobile device by a general mobile device authentication device.

FIG. 2 illustrates a state in which the mobile device authentication device 100 according to the present embodiment identifies the antenna that can be used for authentication of the mobile device 20. In the illustrated example, it is assumed that the mobile device 20 exists behind a left side of the vehicle 1. In identifying an antenna that can be used for authentication, a signal for requesting a reply to the mobile device 20 (hereinafter referred to as a reply request signal) is transmitted from the authentication antennas 10a to 10e in order. In an example shown in FIG. 2, first, the reply request signal is transmitted from the authentication antenna 10a built in the door on the driver's seat side (refer to (a) in FIG. 2). Concentric circular arcs indicated by broken lines in (a) in FIG. 2 represent a state in which the authentication antenna 10a transmits the reply request signal. Next to the authentication antenna 10a, the signal is transmitted from the authentication antenna 10b built in the door of the rear seat on the driver's seat side (refer to (b) in FIG. 2). Next to the authentication antenna 10b, the signal is transmitted from the authentication antenna 10c built in the trunk lid (refer to (c) in FIG. 2). Next, the signal is transmitted from the authentication antenna 10d built in the door of the rear seat on the front passenger seat side (refer to (d) in FIG. 2), and finally, the reply request signal is transmitted from the authentication antenna 10e built in the door on the front passenger seat side (refer to (e) in FIG. 2). After the reply request signal has been transmitted from the authentication antenna 10e, the reply request signals are transmitted again in order from the authentication antenna 10a on the driver's seat side, the authentication antenna 10b, the authentication antenna 10c, the authentication antenna 10d, and the authentication antenna 10e.

As described above, since the distance over which the radio waves transmitted from the authentication antennas 10a to 10e reach is set to be a relatively short distance, even if the reply request signal is transmitted from the authentication antennas 10a to 10c or the authentication antenna 10e, the radio waves do not reach the mobile device 20 that exists at the left rear of the vehicle 1. Therefore, a reply (hereinafter referred to as a reply signal) from the mobile device 20 does not return in response to the reply request signal transmitted from those antennas. On the other hand, as shown in (d) in FIG. 2, since the reply request signal transmitted from the authentication antenna 10d reaches the mobile device 20, the authentication antenna 10d can receive the reply signal from the mobile device 20. As described above, when the reply request signals are transmitted in order from the authentication antennas 10a to 10e and the reply signal is returned from the mobile device 20, it is considered that the mobile device 20 exists within the range in which the radio waves of the antenna reaches. Therefore, an antenna that receives the reply signal (hereinafter referred to as a reception antenna) among the authentication antennas 10a to 10e is selected as an antenna that can be used for authentication of the mobile device 20.

Naturally, any of the authentication antennas 10a to 10e may not receive a reply signal from the mobile device 20. In such a case, it is considered that the mobile device 20 does not exist at least within the range in which the radio waves reach, but there is a possibility that the mobile device 20 exists immediately outside the range. Therefore, even when the reply signal from the mobile device 20 is not received, the reply request signal is transmitted again from the authentication antennas 10a to 10e in order. In this manner, if the reply request signals are transmitted in order from the authentication antennas 10a to 10e, the reply signal can be received by any one of the antennas, and therefore the mobile device 20 can be authenticated by using the reception antenna.

However, in such a method, there is a need to constantly transmit the reply request signal from the authentication antennas 10a to 10e, and the power consumption for that purpose also increases. Therefore, in order to reduce the power consumption, in addition to the authentication antennas 10a to 10e, the detection antenna 11 is also connected to the mobile device authentication device 100 according to the present embodiment. Further, the distance over which the detection antenna 11 can transmit and receive the radio waves is set to be sufficiently longer than the distance over which the authentication antennas 10a to 10e can transmit and receive the radio waves. This makes it possible to greatly reduce the power consumption of the mobile device authentication device 100, as will be described in detail below.

Figure 3:
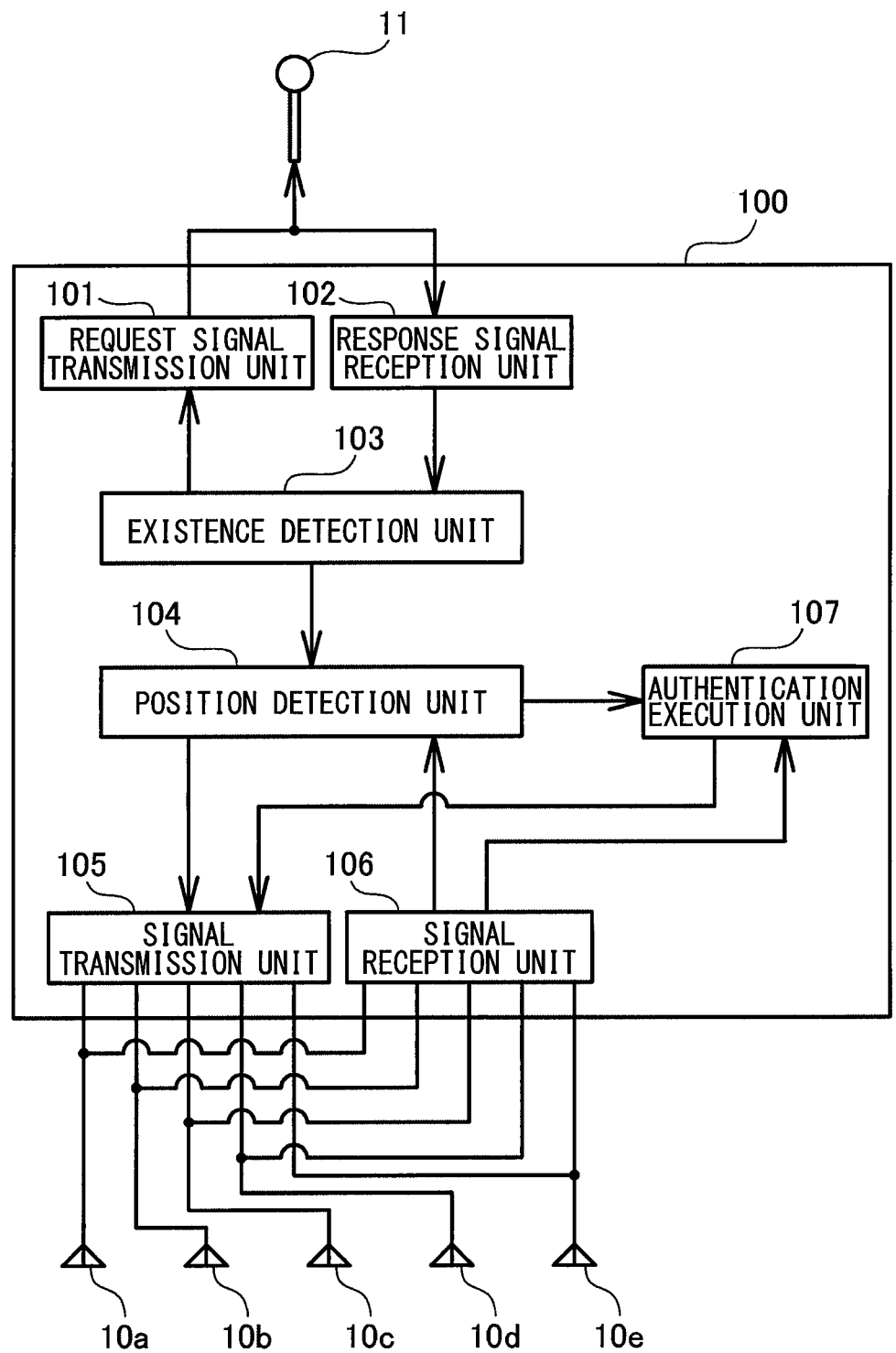
FIG. 3 is a block diagram showing an internal structure of a mobile device authentication device according to the present embodiment.

FIG. 3 shows a rough internal structure of the mobile device authentication device 100 according to the present embodiment. As shown in FIG. 3, the mobile device authentication device 100 according to the present embodiment includes a request signal transmission unit 101, a response signal reception unit 102, an existence detection unit 103, a position detection unit 104, a signal transmission unit 105, a signal reception unit 106, and an authentication execution unit 107. It should be noted that those "units" are abstract concepts in which an inside of the mobile device authentication device 100 is classified for convenience by focusing on the functions provided in the mobile device authentication device 100 for detecting the position of the mobile device 20 and further authenticating the mobile device 20. Therefore, the mobile device authentication device 100 is not physically divided into those "units". Those "units" can be realized as a computer program executed by a CPU, can be realized as an electronic circuit including an LSI and a memory, or can be realized by combining those components together. In the present embodiment, the mobile device authentication device 100 is mainly configured by a microcomputer including a CPU, a ROM, a RAM, and the like, and therefore, the "units" described above are mainly realized by a computer program executed by the CPU.

The request signal transmission unit 101 is connected to the detection antenna 11, and transmits a request signal from the detection antenna 11. In this example, the request signal is a signal for requesting the mobile device 20 to return a response signal. The intensity of the radio waves transmitted by the detection antenna 11 is set to such an intensity that the radio waves reach a sufficiently long distance (typically about 30 to 50 meters) as compared with the authentication antennas 10a to 10e. The response signal reception unit 102 is also connected to the detection antenna 11. If the mobile device 20 exists within the range in which the radio waves from the detection antenna 11 reaches, the mobile device 20 returns a response signal in response to the request signal, so that the response signal can be received by the response signal reception unit 102 through the detection antenna 11. When the response signal reception unit 102 receives the response signal from the mobile device 20, the response signal receiving unit 102 outputs information on that fact to the existence detection unit 103. The request signal transmission unit 101 corresponds to a request signal transmitter, and a response signal reception unit corresponds to a response signal receiver. The detection antenna 11 corresponds to a detection transmission antenna and a detection reception antenna.

The existence detection unit 103 instructs the request signal transmission unit 101 to transmit the request signal at a fixed cycle, and when the response signal reception unit 102 receives the response signal, the existence detection unit 103 acquires information on that fact from the response signal receiving unit 102. Therefore, the existence detection unit 103 can immediately detect the existence of the mobile device 20 when the mobile device 20 enters the range in which the radio waves from the detection antenna 11 reach. However, what can be detected by the existence detection unit 103 is that the mobile device 20 exists within the range in which the radio waves from the detection antenna 11 reach, and the existence detection unit 103 cannot detect the position in which the mobile device 20 exists within the range. Accordingly, upon detection of the existence of the mobile device 20, the existence detection unit 103 outputs information indicating that the mobile device 20 has been detected to the position detection unit 104. The existence detection unit 103 corresponds to an existence detector.

Upon receiving the information indicating that the mobile device 20 has been detected, the position detection unit 104 controls the signal transmission unit 105 to sequentially transmit the reply request signal from the authentication antennas 10a to 10e. In other words, the signal transmission unit 105 is connected to the authentication antennas 10a to 10e, and transmits the reply request signal with the use of the antenna designated by the position detection unit 104. Therefore, the position detection unit 104 first designates the authentication antenna 10a to transmit a reply request signal from the authentication antenna 10a, and then designates the authentication antenna 10b to transmit the reply request signal. Next, the position detection unit 104 designates the authentication antenna 10c, then designates an authentication antenna 10d, and finally, designates the authentication antenna 10e to transmit the reply request signal. With the above configuration, as described above with reference to FIG. 2, the reply request signal can be transmitted from the authentication antennas 10a to 10e in order. The position detection unit 104 corresponds to a position detector, the signal transmission unit 105 corresponds to a signal transmitter.

The authentication antennas 10a to 10e are also connected to the signal reception unit 106. Therefore, when the mobile device 20 receives the reply request signal and transmits the reply signal, the reply signal can be received by any of the authentication antennas 10a to 10e. When the signal reception unit 106 receives the reply signal, the signal receiving unit 106 immediately outputs information on that fact to the position detection unit 104. The signal reception unit 106 corresponds to a signal receiver, and the authentication antennas 10a to 10e correspond to authentication transmission antennas and authentication reception antennas.

As described above, the position detection unit 104 transmits the reply request signal in order from the authentication antennas 10a to 10e, and identifies the antenna receiving the reply signal from the mobile device 20 as the reception antenna. Further, as described above, since the distance over which the radio waves of the authentication antennas 10a to 10e reach is set to a relatively short distance (typically, about 1.5 meters), identification of the reception antenna means that the position at which the mobile device 20 exists is also roughly identified in practice. Upon identifying the reception antenna in this manner, the position detection unit 104 outputs the identified reception antenna to the authentication execution unit 107.

The authentication execution unit 107 starts authentication of the mobile device 20 with the use of the reception antenna designated by the position detection unit 104. In other words, the authentication execution unit 107 is connected to the authentication antennas 10a to 10e through the signal transmission unit 105 and the signal reception unit 106. Therefore, the authentication execution unit 107 designates a reception antenna from among the authentication antennas 10a to 10e, and causes the signal transmission unit 105 to transmit a challenge signal for authentication. When the reception antenna receives the response signal returned from the mobile device 20 in response to the challenge signal, the authentication execution unit 107 starts the authentication of the mobile device 20 after having received the response signal from the signal reception unit 106. As a result, when the authentication is passed, the door of the vehicle 1 is unlocked with the use of an actuator (not shown).

As described above, the mobile device authentication device 100 according to the present embodiment searches for the existence of the mobile device 20 using the detection antenna 11, and upon detecting the existence of the mobile device 20, the mobile device authentication device 100 identifies the reception antenna from among the authentication antennas 10a to 10e, to thereby detect the position of the mobile device 20. Hereinafter, the contents of specific processing performed in the mobile device authentication device 100 according to the present embodiment will be described.

Figure 4:
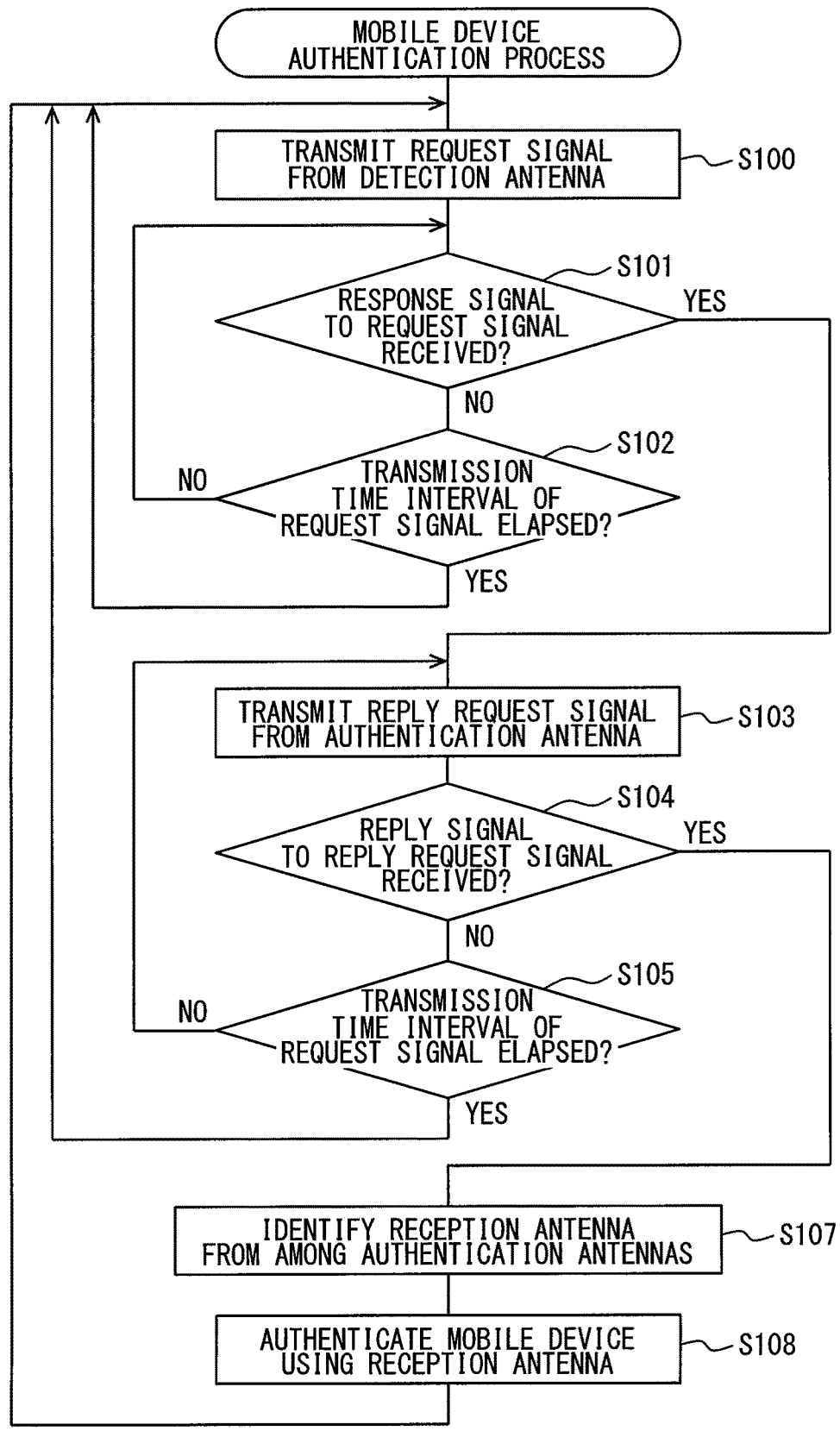
FIG. 4 is a flowchart of a mobile device authentication process to be executed by the mobile device authentication device according to the present embodiment.

B. Mobile Device Authentication Process:

FIG. 4 is a flowchart of a mobile device authentication process to be executed by the mobile device authentication device 100 according to the present embodiment. As shown in the figure, when the mobile device authentication process is started, first, the request signal is transmitted from the detection antenna 11 (S100). As described above, the distance over which the detection antenna 11 can transmit the radio waves is set to be sufficiently longer (typically about 30 to 50 meters) than the distance over which the authentication antennas 10a to 10e can transmit the radio waves. The request signal is a signal for requesting the mobile device 20 to transmit a reply signal.

Then, it is determined whether a response signal from the mobile device 20 to the transmitted request signal has been received by the detection antenna 11 (S101). In the present embodiment, the transmission of the request signal and the reception of the response signal are performed by the same detection antenna 11, but the transmission of the request signal and the reception of the response signal may be performed with the use of different antennas. When the response signal to the request signal has not been received (NO at S101), it is considered that the mobile device 20 does not exist within a range in which the radio waves from the detection antenna 11 reach. Therefore, it is determined whether or not an elapsed time from the transmission of the request signal from the detection antenna 11 has reached an transmission time interval of the request signal (S102).

As a result, if the elapsed time has not reached the transmission time interval of the request signal (NO at S102), there is no need to transmit a next request signal, and therefore it is determined whether or not a response signal to the previously transmitted request signal has been received (S101). When the response signal has not been received (NO at S101), it is determined again whether or not the transmission time interval of the request signal has elapsed (S102). If it is determined that the transmission time interval of the request signal has elapsed while repeating such determination (YES at S102), the process returns to S100, and after transmitting the request signal from the detection antenna 11, it is determined whether or not a response signal to the request signal has been received (S101).

As described above, also in the mobile device authentication process according to the present embodiment, the request signal is transmitted from the detection antenna 11 at predetermined time intervals. However, as described above with reference to FIG. 1, a time interval at which the detection antenna 11 transmits the request signal is set to be sufficiently longer (for example, 5 to 10 seconds) than a time interval at which the authentication antennas 10a to 10e transmit the reply request signal, from the viewpoint of a fact that the radio waves from the detection antenna 11 arrive farther than the radio waves transmitted from the authentication antennas 10a to 10e. When the mobile device 20 enters the range in which the request signal arrives while the request signal is repeatedly transmitted from the detection antenna 11 in this manner, the response signal from the mobile device 20 is received.

Figure 5:
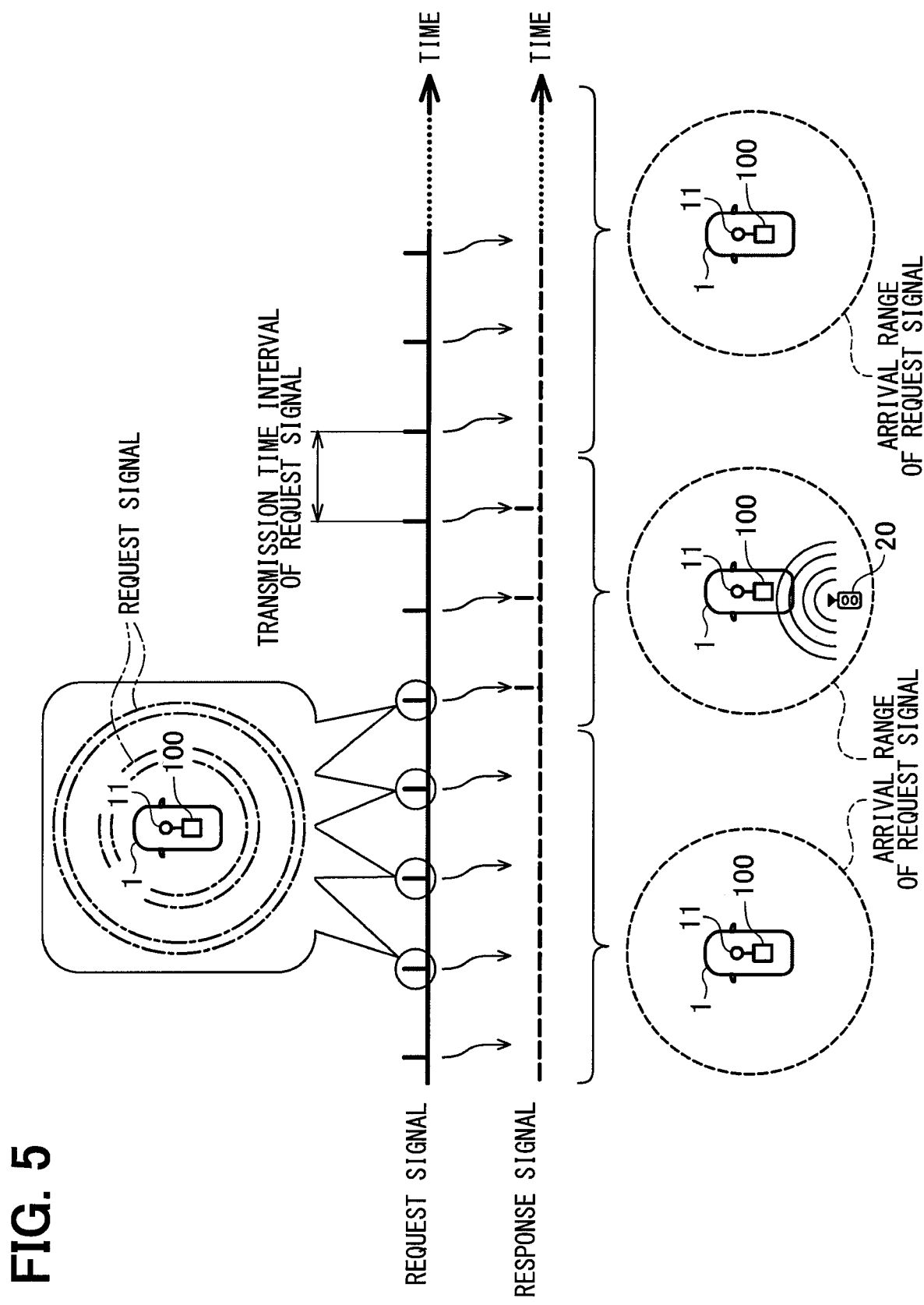
FIG. 5 is an illustrative diagram showing a state in which the mobile device authentication device detects an existence of the mobile device according to the present embodiment.

FIG. 5 illustrates a state in which the mobile device authentication device 100 according to the present embodiment receives the response signal while transmitting the request signal from the detection antenna 11 at predetermined time intervals. An upper part of the figure shows a state in which the request signal is transmitted from the detection antenna 11, and a lower part of the figure shows a state in which the response signal to the request signal is received. As shown in the upper part of the figure, the request signal is transmitted at regular time intervals, but in many cases, the response signal to the request signal cannot be received. However, as shown in the lower part of the figure, when the mobile device 20 exists within an arrival range of the request signal shown by a broken line, the response signal from the mobile device 20 is received.

As described above, it is determined whether or not the response signal to the request signal has been received (S101 in FIG. 4), and when the response signal has been received (YES at S101), it can be considered that the mobile device 20 exists within the arrival range of the request signal. However, since the radio waves from the detection antenna 11 arrive far enough as compared with the radio waves of the authentication antennas 10a to 10e, it is only detected that the mobile device 20 exists somewhere within the arrival range of the request signal.

Therefore, in order to detect the position where the mobile device 20 exists, a reply request signal is transmitted from the authentication antennas 10a to 10e (S103), and it is determined whether or not the reply signal responsive to the reply request signal has been received (S104). In other words, as described above with reference to FIG. 2, it is determined whether or not the reply signal from the mobile device 20 is received while the reply request signal is sequentially transmitted from the five authentication antennas 10a to 10e. Needless to say, the five authentication antennas 10a to 10e may independently transmit and receive the radio waves, and the reply request signals may be simultaneously transmitted from the five authentication antennas 10a to 10e, and whether or not the reply signals are received may be determined simultaneously in parallel by the respective authentication antennas 10a to 10e.

Then, the reply request signals are transmitted from all five authentication antennas 10a to 10e (S103), and when it is determined whether or not the reply signal has been received by each of the authentication antennas 10a to 10e (S104), it is determined whether or not a time interval for transmitting the request signal from the detection antenna 11 (that is, a transmission time interval of the request signal) has elapsed (S105). As a result, when the transmission time interval of the request signal has not elapsed (NO at S105), the process returns to S103, and the reply request signals are transmitted again from the authentication antennas 10a to 10e (S103), and it is determined whether or not the reply signal responsive to the reply request signal has been received (S104). On the other hand, when the transmission time interval of the request signal has elapsed (YES at S105), the process returns to the beginning of the process, and the request signal is transmitted from the detection antenna 11 (S100).

Figure 6:
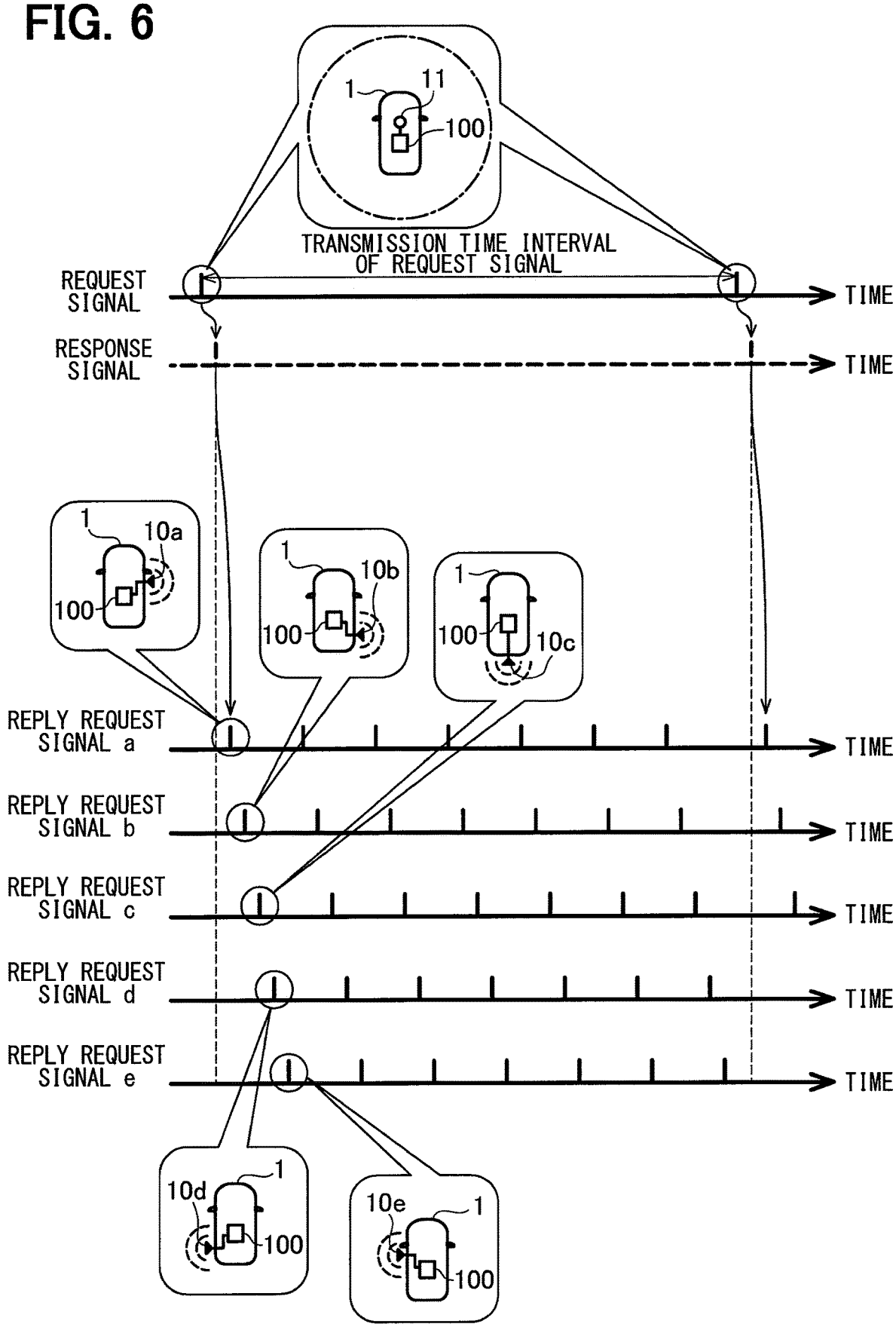
FIG. 6 is an illustrative diagram showing a state in which the mobile device authentication device according to the present embodiment detects a position of the mobile device.

FIG. 6 shows a state in which the mobile device authentication device 100 according to the present embodiment transmits the request signal from the detection antenna 11 while transmitting the reply request signals in order from the authentication antennas 10a to 10e. In the upper part of the figure, the request signal is transmitted from the detection antenna 11 at predetermined transmission time intervals, and the response signal to the request signal is received. As described above with reference to FIG. 4, when the mobile device authentication device 100 receives the response signal, the mobile device authentication device 100 transmits the reply request signals in order from the authentication antennas 10a to 10e.

In the lower part of the figure, a state in which the reply request signal is transmitted in order from the authentication antennas 10a to 10e is shown. In other words, first, a reply request signal a is transmitted from the authentication antenna 10a, then a reply request signal b is transmitted from the authentication antenna 10b, then a reply request signal c is transmitted from the authentication antenna 10c, then a reply request signal d is transmitted from the authentication antenna 10d, and finally, a reply request signal e is transmitted from the authentication antenna 10e (refer to S103 in FIG. 4). Whenever the reply request signals a to e are transmitted, it is determined whether or not a reply signal from the mobile device 20 has been received (S104).

In this way, the reply request signal is transmitted in order from the authentication antennas 10a to 10e (S103), and when the reply signal responsive to the reply request signal has not been received (NO at S104), it is determined whether or not the transmission time interval of the request signal has elapsed (S105).

In an example shown in FIG. 6, the transmission time interval of the request signal has not yet elapsed at the time when the response signal to the request signal has been received and a first round of the reply request signals a to e (indicated with circles in the figure) has been transmitted. Therefore, in S105 of FIG. 4, it is determined as "NO", and the transmission of a second round of reply request signals a to e is started (S103 of FIG. 4). As shown in FIG. 6, since the transmission time interval of the request signal has not elapsed even at the time point when the transmission of the second round of the reply request signals a to e has been finished, a third round of the reply request signals a to e is transmitted.

In this manner, while the reply request signals a to e are sequentially transmitted from the authentication antennas 10a to 10e, the transmission time interval of the request signal elapses, and it is determined as "YES" in S105 of FIG. 4. Then, the mobile device authentication device 100 according to the present embodiment transmits the request signal from the detection antenna 11 (S100), and when the response signal from the mobile device 20 responsive to the request signal has been received (YES at S101), the reply request signals a to e are transmitted in order from the authentication antennas 10a to 10e again (S103).

As described above, the mobile device authentication device 100 according to the present embodiment continues to transmit the reply request signals a to e in order from the authentication antennas 10a to 10e while receiving the response signal from the mobile device 20 in response to the request signal from the detection antenna 11. While repeating such a procedure, the mobile device 20 approaches the vehicle 1 and receives the reply request signal transmitted from any of the authentication antennas 10a to 10e, and then transmits the reply signal (refer to FIG. 2). Then, the reply signal is received by any of the authentication antennas 10a to 10e, and "YES" is determined in S104 of FIG. 4. As described above, since the mobile device authentication device 100 transmits the reply request signal in order from the authentication antennas 10a to 10e, which of the authentication antennas 10a to 10e is the reception antenna receiving the reply signal can be identified according to the timing of receiving the reply signal (S107). As described above, since the distance that the radio waves of the authentication antennas 10a to 10e reach is set to a relatively short distance (typically, about 1.5 meters), identification of the reception antenna virtually identifies the existence position of the mobile device 20.

After the reception antenna has been identified in this manner, the mobile device 20 is authenticated with the use of the identified reception antenna (S108). As a method of authenticating the mobile device 20, a general method can be used. In other words, a challenge signal for authentication is transmitted with the use of the antenna identified as the reception antenna among the authentication antennas 10a to 10e. When the response signal to the challenge signal is returned from the mobile device 20, a response signal is received and analyzed to authenticate whether or not the mobile device 20 is a regular mobile device 20. After the mobile device 20 has been authenticated in this manner (S108), the process returns to the beginning of the process, and after the request signal has been transmitted from the detection antenna 11 (S100), the series of processes described above is repeated.

Since the mobile device authentication device 100 and the mobile device detection method according to the present embodiment perform the mobile device authentication process as described above in order to authenticate the mobile device 20, the power consumption of the mobile device authentication device 100 can be greatly reduced.

Figure 7A:
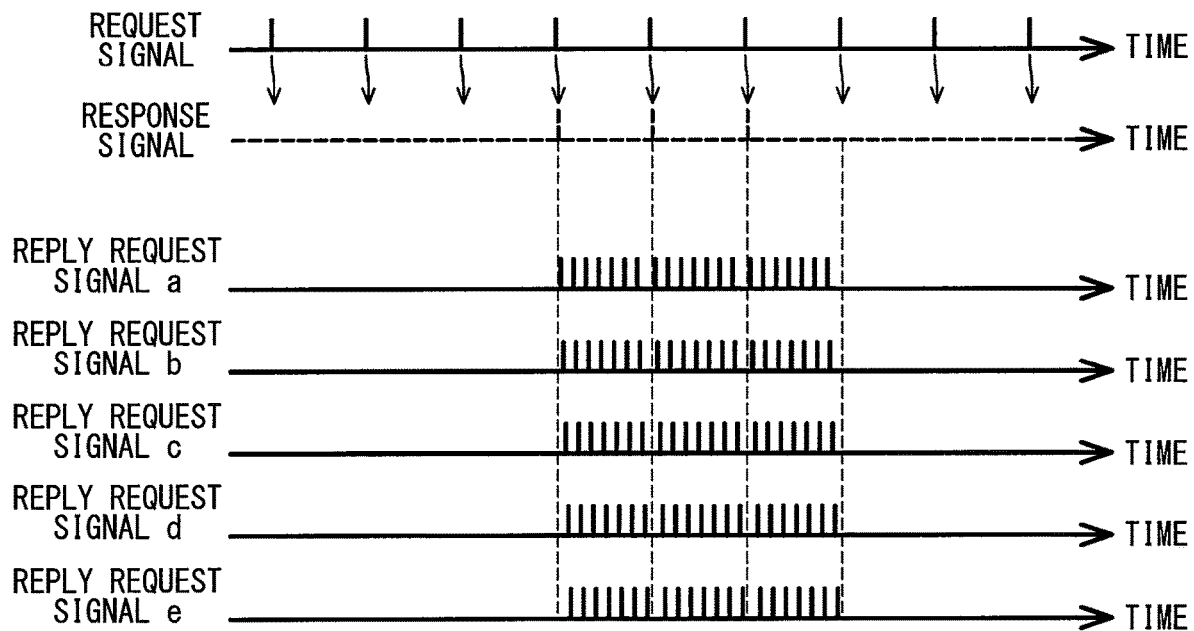
FIG. 7A is an illustrative diagram showing a reason why a power consumption is reduced in the mobile device authentication device according to the present embodiment.
Figure 7B:
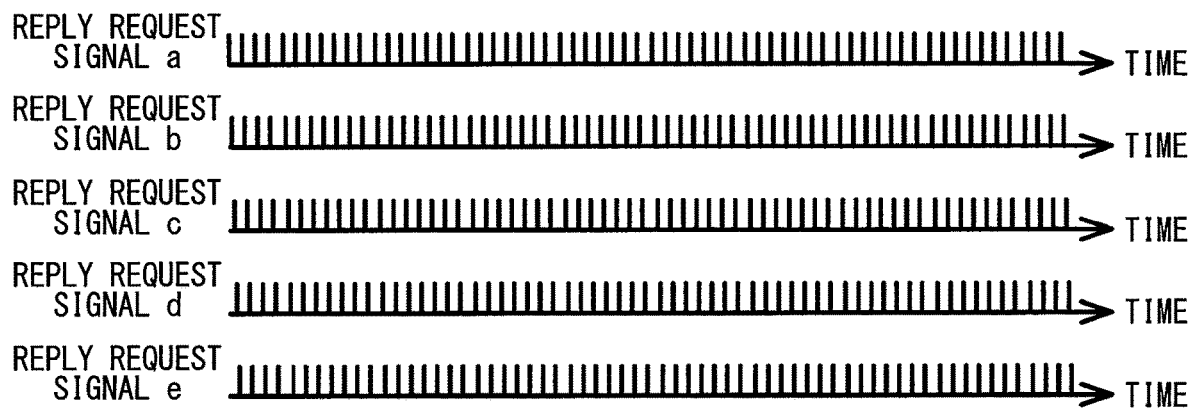
FIG. 7B is an illustrative diagram showing the power consumption in a mobile device authentication device according to a comparative example.

FIGS. 7A and 7B show a mechanism by which the mobile device authentication device 100 drastically reduces the power consumption according to the present embodiment. As shown in FIG. 7A, the mobile device authentication device 100 according to the present embodiment transmits a request signal from the detection antenna 11 at predetermined time intervals, and when a response signal to the request signal is received, the mobile device authentication device 100 transmits the reply request signals a to e from the authentication antennas 10a to 10e in order (refer to FIG. 6). However, while the response signal to the request signal is not received, there is no need to transmit the reply request signals a to e from the authentication antennas 10a to 10e. In addition, when a period in which the response signal to the request signal is received is compared with a period in which the response signal is not received, the period in which the response signal is not received is usually longer. Therefore, the reply request signal is not transmitted while the response signal to the request signal is not received, thereby being capable of greatly reducing the power required for transmitting the reply request signal.

FIG. 7B shows, as a reference, a state in which a mobile device authentication device according to a comparative example continues to transmit the reply request signals a to e from the authentication antennas 10a to 10e. In comparison between FIGS. 7A and 7B, it can be immediately understood that the power required to transmit the reply request signal can be greatly reduced by not transmitting the reply request signal while the response signal to the request signal is not received.

It is needless to say that the mobile device authentication device 100 according to the present embodiment also needs to continue to transmit the request signal to be transmitted from the detection antenna 11 at predetermined time intervals. However, as described above, the radio waves transmitted from the authentication antennas 10a to 10e are used for authentication of the mobile device 20, whereas the radio waves transmitted from the detection antenna 11 are used for detecting the existence of the mobile device 20, and are not used for authentication. For that reason, the distance that the radio waves from the detection antenna 11 reach can be set to be sufficiently longer than the distance that the radio waves from the authentication antennas 10a to 10e reach. As a result, the time interval at which the request signal is transmitted from the detection antenna 11 can be set to be sufficiently longer than the time interval at which the reply request signal is transmitted from the authentication antennas 10a to 10e.

For that reason, the frequency of transmitting the request signal from the detection antenna 11 can be set to be smaller than the frequency of transmitting the reply request signal from the authentication antennas 10a to 10e, so that the power consumption of the mobile device authentication device 100 can be reduced from this viewpoint as well. In addition, the radio waves in a band around 2 GHz can be used as the radio waves transmitted from the detection antenna 11, and a technique of making it possible to transmit and receive the radio waves in the band with less power than in the past has been put into practical use. Therefore, with the application of the technique, the power consumption of the mobile device authentication device 100 can be further reduced.

C. Modification:

There are several modifications of the mobile device authentication device 100 according to the present embodiment described above. Hereinafter, those modifications will be briefly described focusing on differences from the present embodiment.

C-1. First Modification:

In the present embodiment described above, the existence position of the mobile device 20 is detected based on whether or not the reply request signal is transmitted from the authentication antennas 10a to 10e having a short radio wave arrival distance and the reply signal is received from the mobile device 20. However, the existence position of the mobile device 20 may be detected based on the signal strength at the time of receiving the reply signal instead of whether or not the reply signal from the mobile device 20 is received. Hereinafter, a mobile device authentication device 150 according to a first modification will be described.

Figure 8:
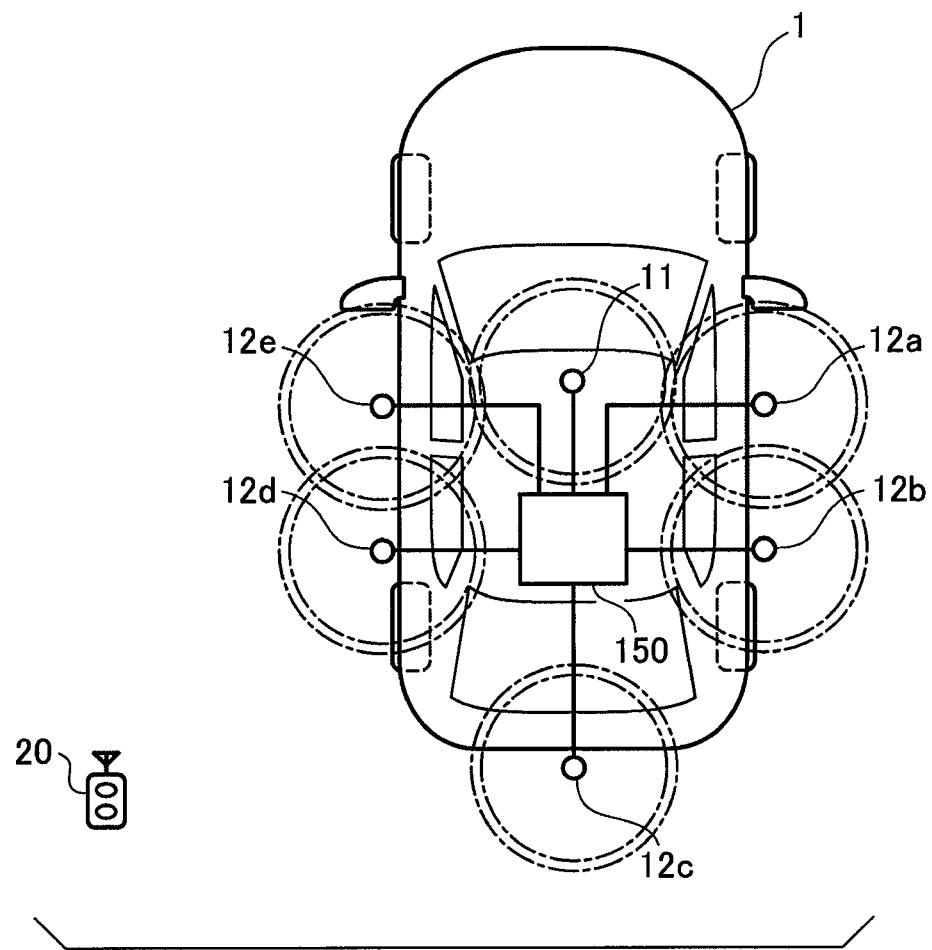
FIG. 8 is an illustrative diagram showing a rough configuration of a vehicle equipped with a mobile device authentication device according to a first modification.

FIG. 8 shows a rough structure of a vehicle 1 including the mobile device authentication device 150 according to the first modification. As shown in the figure, in the vehicle 1 provided with the mobile device authentication device 150 according to the first modification, instead of the authentication antennas 10a to 10e having a shorter radio wave arrival distance than that of the detection antenna 11, authentication antennas 12a to 12e having a longer radio wave arrival distance like the detection antenna 11 are mounted. The mobile device authentication device 150 according to the first modification is connected with the authentication antennas 12a to 12e instead of the authentication antennas 10a to 10e. Similar to the mobile device authentication device 100 according to the embodiment described above, the mobile device authentication device 150 according to the first modification can also detect an existence position of a mobile device 20 by transmitting reply request signals from the authentication antennas 12a to 12e in order.

Figure 9:
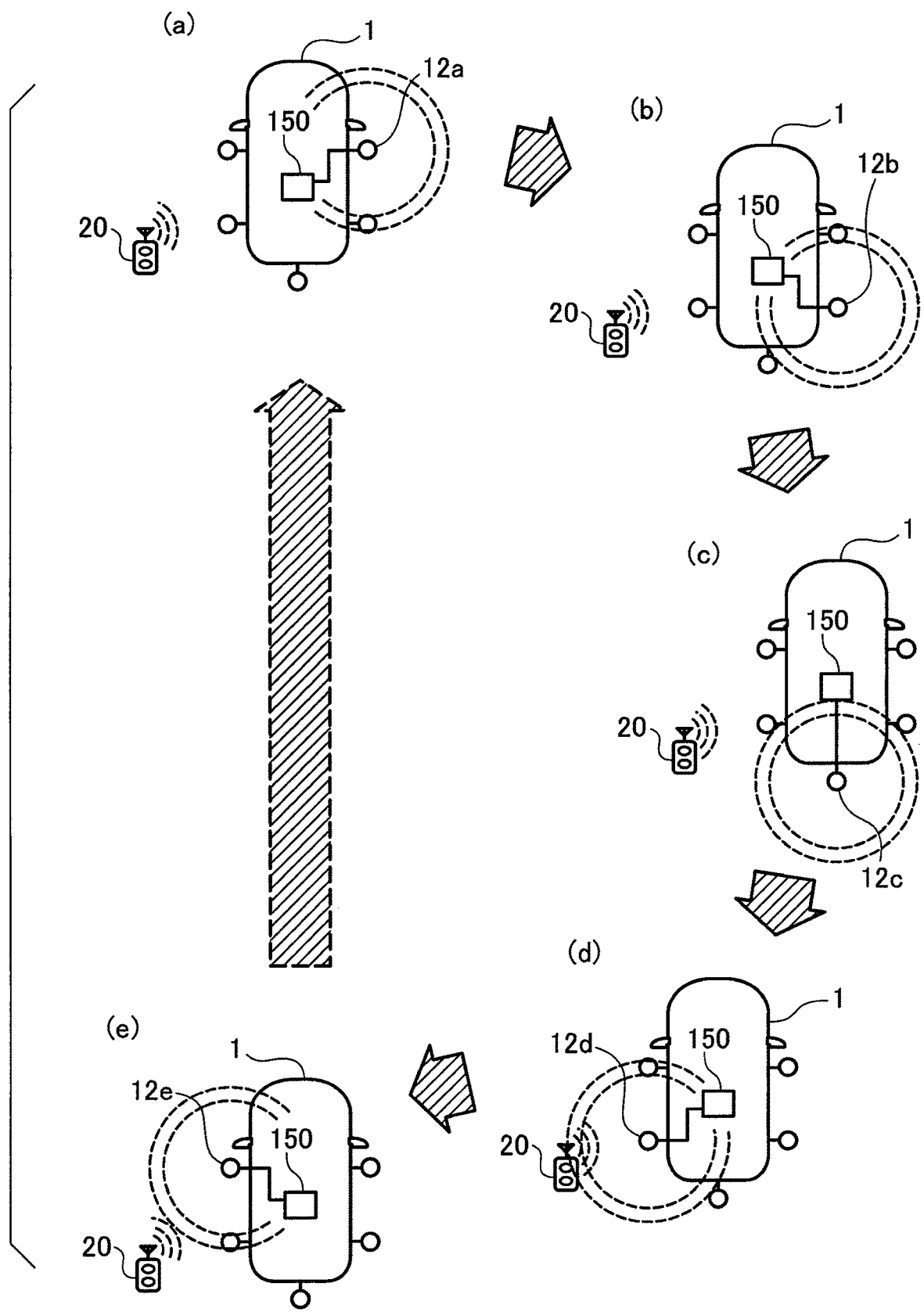
FIG. 9 is an illustrative diagram showing a state in which the mobile device authentication device according to the first modification detects an existence of the mobile device.

FIG. 9 shows a state in which the mobile device authentication device 150 detects the existence position of the mobile device 20 according to the first modification. Also in the example shown in FIG. 9, it is assumed that the mobile device 20 exists behind a left side of the vehicle 1. Also in the case of the first modification, the reply request signals are sequentially transmitted from the authentication antennas 12a to 12e. The authentication antennas 12a to 12e according to the first modification are set to have a sufficiently long distance over which radio waves arrive, as compared with the authentication antennas 10a to 10e according to the present embodiment described above. For that reason, in many cases, if the reply request signal transmitted from any of the authentication antennas 12a to 12e reaches the mobile device 20, the reply request signals from the other authentication antennas 12a to 12e also reach the mobile device 20.

Therefore, as shown in (a) in FIG. 9, first, the reply request signal is transmitted from the authentication antenna 12a, and a signal strength of the reply signal returned from the mobile device 20 is detected. In general, since the intensity of the radio waves transmitted from the antenna become smaller as a distance from the antenna increases, a rough distance from the mobile device 20 can be obtained by detecting the signal strength of the reply signal.

Subsequently, as shown in (b) in FIG. 9, the reply request signal is also transmitted from the authentication antenna 12b, and the signal strength of the reply signal from the mobile device 20 is detected. Then, a rough distance from the mobile device 20 to the authentication antenna 12b is acquired based on the signal strength detected by the authentication antenna 12b. Similarly, each of the other authentication antennas 12c 12e acquires a rough distance from the mobile device 20 by transmitting the reply request signal in turn and detecting the signal strength of the reply signal from the mobile device 20.

In this way, once the rough distance from the mobile device 20 is obtained for all of the authentication antennas 12a to 12e, the existence position of the mobile device 20, which is considered to be the most reliable, is determined on the basis of those distances. When the determined existence position is a position close to the vehicle 1 (for example, a position within 1.5 meters from the vehicle 1) to the extent that the mobile device 20 needs to be authenticated, the mobile device 20 is authenticated by selecting an antenna close to the mobile device 20 from the authentication antennas 12a to 12e and communicating with the mobile device 20 with the use of the selected antenna.

Even in the case of the mobile device authentication device 150 according to the first modification, the request signal is transmitted from the detection antenna 11 at a predetermined time interval, similarly to the mobile device authentication device 100 according to the present embodiment described above. Then, when the response signal to the request signal is received, the existence position of the mobile device 20 is detected by transmitting the reply request signal from the authentication antennas 12a to 12e as described with reference to FIG. 9. With the above configuration, there is no need to transmit the reply request signal from the authentication antennas 12a to 12e while the response signal to the request signal is not received. For that reason, for the same reason as in the present embodiment described above, the power required for transmitting the reply request signal can be greatly reduced.

Also in the case of the first modification, a time interval for transmitting the request signal from the detection antenna 11 can be set to be longer than a time interval for transmitting the reply request signal from each of the authentication antennas 12a to 12e. The reason will be described below.

First, it is assumed that the position where authentication of the mobile device 20 is necessary is, for example, a position within 1.5 meters from the vehicle 1. In that case, if it is assumed that the existence position of the mobile device 20 detected with the use of the authentication antennas 12a to 12e is a position of 2.5 meters from the vehicle 1, the mobile device 20 may move to a position requiring authentication within 1 second. Therefore, the authentication antennas 12a to 12e need to transmit the reply request signal at a certain short time interval.

On the other hand, since the detection antenna 11 can detect the mobile device 20 which exists sufficiently far, the time interval at which the detection antenna 11 transmits the request signal can be set to be longer than the time interval at which the authentication antennas 12a to 12e transmit the reply request signal. For that reason, also in the mobile device authentication device 150 according to the first modification, the power consumption of the mobile device authentication device 150 can be reduced for the same reason as in the present embodiment described above.

C-2. Second Modification:

Further, according to the first modification described above, the reply request signals are sequentially transmitted from the authentication antennas 12*a* to 12*e* and the antenna that transmits the reply request signal receives the reply signal from the mobile device 20.

Alternatively, the reply request signal may be transmitted from any one of the authentication antennas 12*a* to 12*e* or the detection antenna 11, and the authentication antennas 12*a* to 12*e* may simultaneously receive the reply signal responsive to the reply request signal.

Figure 10:
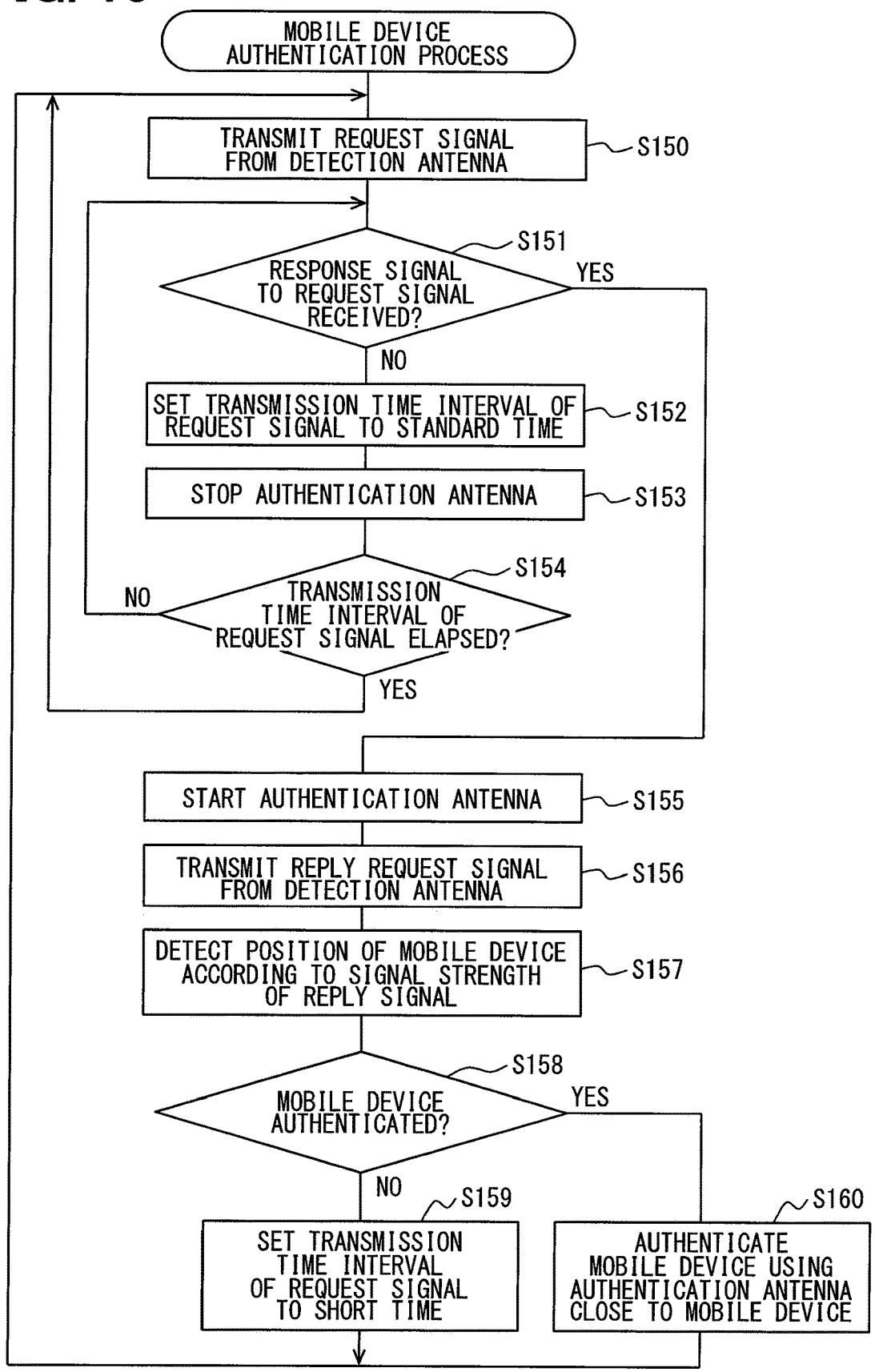
FIG. 10 is a flowchart of a mobile device authentication process to be executed by a mobile device authentication device according to a second modification.

FIG. 10 shows a flowchart of a mobile device authentication process to be executed by a mobile device authentication device 150 according to a second modification. As shown in the figure, also in the case of the second modification, when the mobile device authentication process is started, first, a request signal is transmitted from the detection antenna 11 (S150). Then, it is determined whether a response signal to the transmitted request signal has been received by the detection antenna 11 (S151). In this example, it is assumed that the request signal is transmitted with the use of the detection antenna 11 and the response signal is received with the use of the detection antenna 11, but any of the authentication antennas 12*a* to 12*e* may be used instead of the detection antenna 11.

When the response signal to the request signal is not received (NO at S151), it is considered that the mobile device 20 does not exist within a range in which the radio waves from the detection antenna 11 arrive, and therefore, a transmission time interval of the request signal is set to a standard time (S152). In this example, in the second modification, as transmission time intervals of the request signal, two types of a standard time interval and a shorter time interval than the standard are set. As will be described later in detail, when a mobile device 20 exists within a range in which the radio waves from the detection antenna 11 arrive (that is, when a response signal to the request signal is received), the transmission time interval of the request signal is set to a short time. Therefore, when the response signal to the request signal is not received (NO at S151), the standard time is set in preparation for the case where the transmission time interval of the request signal is set to a short time.

The operation of the authentication antennas 12*a* to 12*e* is stopped (S153). In other words, since the authentication antennas 12*a* to 12*e* are used for detecting the existence position of the mobile device 20 when the mobile device 20 exists within a range in which the radio waves from the detection antenna 11 reach (therefore, when the response signal to the request signal is received), it is considered that the authentication antennas 12*a* to 12*e* are not used when the response signal is not received (NO at S151). Therefore, in order to reduce the power consumption of the mobile device authentication device 150, the operation of the authentication antennas 12*a* to 12*e* is stopped.

It is determined whether or not the elapsed time from the transmission of the request signal from the detection antenna 11 has reached the transmission time interval of the request signal (S154). As a result, when the elapsed time has not reached the transmission time interval of the request signal (NO at S154), it is determined whether or not the response signal to the request signal has been received (S151). When the transmission time interval of the request signal has elapsed (YES at S154), the process returns to S150, and after transmitting the request signal from the detection antenna 11 again, it is determined whether or not the response signal to the request signal has been received (S151).

If the response signal to the request signal is received while repeating the above processing (YES at S151), it is considered that the mobile device 20 exists within a arrival range of the request signal, and therefore, the authentication antennas 12*a* to 12*e* are activated in order to detect the existence position of the mobile device 20 (S155). Then, the reply request signal is transmitted from the detection antenna 11 (S156). Then, since the reply signal responsive to the reply request signal is returned from the mobile device 20, the signal strength of the reply signal is detected with the use of the activated authentication antennas 12*a* to 12*e*. The existence position of the mobile device 20 is detected based on the signal strength detected by the authentication antennas 12*a* to 12*e* in the same manner as in the first modification described above (S157).

At this time, the detection antenna 11 may also detect the signal strength of the reply signal. With the above processing, since the distance to the mobile device 20 is required for a larger number of antennas, a detection accuracy of the existence position of the mobile device 20 can be improved.

When the existence position of the mobile device 20 is detected in this manner, it is determined whether or not the mobile device 20 is authenticated (S158). Similar to the first modification described above, it is determined whether or not the detected existence position of the mobile device 20 is within a predetermined distance (for example, 1.5 meters) from the vehicle 1, and if the detected existence position is within the predetermined distance, it is determined that the mobile device 20 is to be authenticated (YES at S158). In this case (YES at S158), the mobile device 20 is authenticated by selecting the antenna close to the mobile device 20 from the authentication antennas 12*a* to 12*e* and communicating with the mobile device 20 with the use of the antenna (S160).

On the other hand, when it is determined that the mobile device 20 is not to be authenticated (NO at S158), a transmission time interval of the request signal is set to a time shorter than the standard (for example, 1 second) (S159). In other words, when it is determined that the mobile device 20 is not to be authenticated (NO at S158), it is considered that the mobile device 20 exists in the periphery of the vehicle 1, but is not so close to the vehicle 1 as to require authentication. Therefore, when the mobile device 20 approaches the vehicle 1, the time interval for transmitting the request signal is set to the short time so that the approach to the vehicle 1 can be immediately detected to start authentication.

When the transmission time interval of the request signal is set to the short time (S159), the process returns to the beginning of the process, and after the request signal is transmitted from the detection antenna 11 (S150), the series of processes described above is repeated.

In the case of the second modification described above, while the response signal to the request signal is not received, the operation of the authentication antennas 12*a* to 12*e* is stopped, and when the response signal is received, the authentication antennas 12*a* to 12*e* may be activated, so that the power consumption of the mobile device authentication device 150 can be reduced. In addition, while the response signal to the request signal is not received, the transmission time interval of the request signal can be set to be longer than an interval during which the response signal is received.

This makes it possible to reduce the power required for transmission of the request signal.

Although the disclosure has been described in accordance with the embodiments, it is understood that the present disclosure is not limited to the above embodiments or structures. The present disclosure encompasses various modifications and variations within the scope of equivalents. In addition, various combinations and configurations, as well as other combinations and configurations that include only one element, more, or less, fall within the scope and spirit of the present disclosure.

The invention claimed is:

1. A mobile device detection apparatus to be mounted on a vehicle equipped with a plurality of antennas, for detecting an existence position of a mobile device that exists within a range communicable with the vehicle, the mobile device detection apparatus comprising:
   an existence detector that transmits a request signal for requesting a response to the mobile device from a predetermined antenna among the plurality of antennas at a first time interval and receives a response signal returned from the mobile device to detect an existence of the mobile device; and
   a position detector that transmits a reply request signal for requesting a reply signal to the mobile device at a second time interval when the existence of the mobile device is detected, and receives the reply signal from the mobile device using the plurality of antennas to detect the existence position of the mobile device, wherein
   the first time interval at which the existence detector transmits the request signal is set to be longer than the second time interval at which the position detector transmits the reply request signal.

2. The mobile device detection apparatus according to claim 1, wherein
   the position detector detects the existence position of the mobile device by identifying a reception antenna that has received the reply signal from among the plurality of antennas, and
   the existence detector detects the existence of the mobile device by transmitting the request signal in a range wider than a range in which the position detection unit detects the existence position of the mobile device.

3. The mobile device detection apparatus according to claim 2, wherein
   the position detector transmits the reply request signal from the plurality of antennas at timings different from one another, and identifies the reception antenna based on a timing at which the reply signal from the mobile device is received.

4. The mobile device detection apparatus according to claim 1, wherein
   the existence detector detects whether the mobile device exists based on the existence or absence of the response signal to the request signal, and
   the position detector detects the existence position of the mobile device based on a signal strength of the reply signal received by the plurality of antennas.

5. The mobile device detection apparatus according to claim 4, wherein
   the position detector is activated when the existence of the mobile device is detected by the existence detector.

6. The mobile device detection apparatus according to claim 1, wherein
   each of the existence detector and the position detector is realized by a computer program executed by a processor, an electronic circuit, or a combination of a computer program executed by a processor and an electronic circuit.

7. The mobile device detection apparatus according to claim 1, wherein
   the first time interval is set to be in a range from 5 to 10 seconds.

8. The mobile device detection apparatus according to claim 1, wherein the position detector is further configured to identify a reception antenna that is one of the plurality of antennas through which the reply signal transmitted from the mobile device is received, the mobile device detection apparatus further comprising
   an authentication executioner that transmits a challenge signal for authentication from the reception antenna, and executes authentication of the mobile device after receiving a response signal returned from the mobile device in response to the challenge signal through the reception antenna.

9. A mobile device detection method applied to a vehicle equipped with a plurality of antennas, for detecting an existence position of a mobile device that exists within a range communicable with the vehicle, the mobile device detection method comprising:
   transmitting a request signal for requesting a response to the mobile device from a predetermined antenna among the plurality of antennas at a first time interval;
   receiving a response signal returned from the mobile device to detect an existence of the mobile device;
   transmitting a reply request signal for requesting a reply signal to the mobile device at a second time interval upon detecting the existence of the mobile device; and
   receiving the reply signal from the mobile device using the plurality of antennas to detect the existence position of the mobile device, wherein
   the first time interval at which the request signal is transmitted is set to be longer than the second time interval at which the reply request signal is transmitted.

10. The mobile device detection method according to claim 9, wherein
    the first time interval is set to be in a range from 5 to 10 seconds.

11. The mobile device detection method according to claim 9, further comprising:
    identifying a reception antenna that is one of the plurality of antennas through which the reply signal from the mobile device is received;
    transmitting a challenge signal for authentication from the reception antenna; and
    executing an authentication when a reception signal returned from the mobile device in response to the challenge signal is received through the reception antenna.

12. A mobile device detection apparatus to be mounted on a vehicle equipped with a plurality of antennas, for detecting an existence position of a mobile device that exists within a range communicable with the vehicle, the plurality of antennas including a detection transmission antenna, a detection reception antenna, a plurality of authentication transmission antennas, and a plurality of authentication reception antennas, the mobile device detection apparatus comprising:
    a request signal transmitter configured to be connected to the detection transmission antenna;
    a response signal receiver configured to be connected to the detection reception antenna;
    an existence detector connected to the request signal transmitter and the response signal receiver, instructing the request signal transmitter to transmit a request signal for requesting a response at a first time interval through the detection transmission antenna, and detecting an existence of the mobile device by acquiring information, from the response signal receiver, that the response signal receiver receives a response signal from the mobile device through the detection reception antenna;

a signal transmitter configured to be connected to the plurality of authentication transmission antennas;

a signal receiver configured to be connected to the plurality of authentication reception antennas; and a position detector connected to the existence detector, the signal transmitter, and the signal receiver, instructing the signal transmitter to transmit a reply request signal for requesting a reply signal at a second time interval through each of the plurality of authentication transmission antennas when receiving information, from the existence detector, that the existence detector detects the existence of the mobile device, and detecting the existence position of the mobile device based on the reply signal transmitted from the mobile device and received by the signal receiver through at least one of the plurality of authentication reception antennas, wherein the first time interval is set to be longer than the second time interval.

13. The mobile device detection apparatus according to claim 12, wherein each of request signal transmitter, the response signal receiver, the existence detector, the signal transmitter, the signal receiver, and the position detector is realized by a computer program executed by a processor, an electronic circuit, or a combination of a computer program executed by a processor and an electronic circuit.

14. The mobile device detection apparatus according to claim 12, wherein the first time interval is set to be in a range from 5 to 10 seconds.

15. The mobile device detection apparatus according to claim 12, wherein the position detector is further configured to identify a reception antenna that is one of the plurality of authentication reception antennas through which the reply signal transmitted from the mobile device is received, the mobile device detection apparatus further comprising an authentication executioner connected with the signal transmitter, the signal receiver, and the position detector, and instructing the signal transmitter to transmit a challenge signal for authentication from the reception antenna, and executing authentication of the mobile device when the signal receiver receives a response signal returned from the mobile device in response to the challenge signal through the reception antenna.

* * * * *